United States Patent Office 2,734,063
Patented Feb. 7, 1956

2,734,063
SYNTHESIS OF PYRIDOXINE

Philip G. Stevens, Old Greenwich, Conn., assignor to General Aniline & Film Corporation, New York, N. Y., a corporation of Delaware No Drawing. Application December 22, 1950, Serial No. 202,404

12 Claims. (Cl. 260—295.5)

This invention relates to improvements in the synthesis of pyridoxine (i. e., vitamin $B_6$), and intermediates therefor.

It is an object of this invention to provide a relatively economical and convenient method for synthesizing pyridoxine, and to provide a series of novel intermediates therefor.

In accordance with this invention, an ether of 1,4-dihydroxybutanone-2 is converted to the corresponding formyl derivative (ordinarily obtained in the form of the alkali metal enolate) by reaction with an alkyl formate in the presence of an alkaline catalyst (especially an alkali metal alcoholate). The 1,4-dihydroxybutanone-2 ether employed as the starting material is one in which both hydroxyl groups are etherified, either with each other to form a cyclic inner ether, i. e., 3-ketotetrahydrofurane, or with lower alkyl groups such as methyl or ethyl groups to form the straight-chain dimethyl or diethyl ether of 1,4-dihydroxybutanone-2. 1,4-dihydroxybutanone-2 can be obtained by condensing acetylene with formaldehyde to form 1,4-butynediol and hydrolyzing to the corresponding ketone. Formation of the aforesaid formyl derivative is illustrated by the following equations:

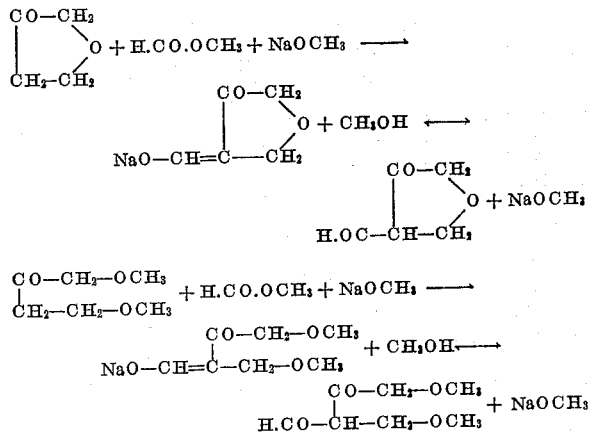

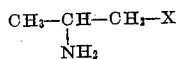

The foregoing condensation is advantageously carried out without a solvent, or in an alcohol such as methanol or ethanol as a reaction medium, at low temperature (e. g. 0° to 25° C.).

The resulting ether of 3-formyl-1,4-dihydroxybutanone-2 is then condensed with a compound having the formula:

$$CH_3-CH-CH_2-X$$
$$\phantom{CH_3-C}|$$
$$\phantom{CH_3-CH-}NH_2$$

wherein X is a negative radical which activates the adjacent $CH_2$ group, especially a carboxyl, carbothioic or carbodithioic group, or a functional derivative thereof such as a corresponding amide, N-substituted amide, nitrile, or ester thereof; or a lower alkyl-keto or -thioketo group such as the methyl-keto group, or a nitro group, to form a 2-methyl-dihydropyridine-4,5-dimethylol ether in which both of the methylol groups are etherified, and which contains the group X as a substituent in 3- position. The formation of the aforesaid dihydropyridine compound is illustrated by the following equations:

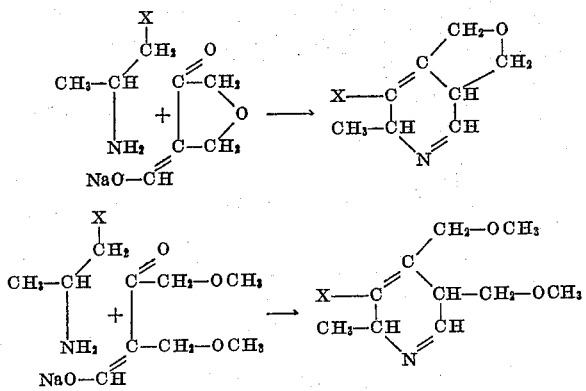

The latter condensation is advantageously carried out in the same reaction mixture as the formation of the formyl derivative of the dihydroxybutanone ether, i. e., in an alcohol and in the presence of the alkali forming the enolate of the formyl compound. A moderate reaction temperature is used, e. g. a temperature of 20° to 30° C.

The dihydropyridine compound thus obtained is oxidized (or dehydrogenated), e. g. by treatment with an oxidizing agent such as a permanganate, bichromate, or preferably hydrogen peroxide, or with a dehydrogenation catalyst such as nickel, platinum or palladium, to form the corresponding 2-methylpyridine-4,5-dimethylol ether containing the radical X as a substituent in 3-position. The dehydrogenation is illustrated by the following equations:

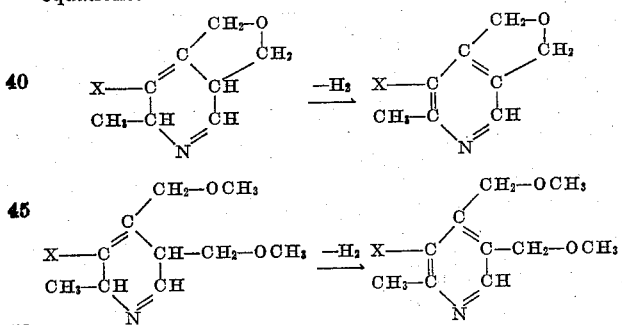

Dehydrogenation by treatment with oxidizing agents such as permanganate, bichromate or hydrogen peroxide, is best carried out in an aqueous reaction medium, while dehydrogenation catalysts such as nickel, platinum or palladium can be used for the same purposes in an alcoholic reaction medium.

The resulting substituted pyridine compound is converted to the corresponding 3-amino derivative by known methods. Thus, when X is a nitro group, it can be reduced to the amino group by treatment with hydrogen in the presence of a hydrogenation catalyst such as nickel, platinum or palladium, or reacted with a metal such as iron, tin or zinc in the presence of a mineral acid. When X is originally a carboxyl group, or a carbothioic or carbodithioic acid group, it can be converted to an amino group by a modification of the Curtius reaction involving treatment with an alkali metal azide in acid medium, whereby the carboxy-azide group presumably formed is converted to an amino group with elimination of nitrogen and of carbon dioxide or its thio analogs. Alternatively, the aforesaid carboxyl group or thio analogue thereof can be converted to the corresponding acyl halide (e. g. by reaction with thionyl chloride), then to the amide by reaction with ammonia, and the amide subjected to the Hofmann reaction involving treatment with a hypohalite to form the corresponding amine. Functional derivatives of carboxylic, carbothioic or carbodithioic acid groups can be converted to the free acid groups by hydrolysis, and keto or thioketo groups can be oxidized to carboxyl groups and then converted to amino groups by the modified Curtius reaction or Hofmann reaction, just described.

The resulting 2-methyl-3-aminopyridine-4,5-dimethylol ether is converted by diazotization with nitrous acid and thermal decomposition of the resulting diazo compound to the corresponding 2 - methyl-3-hydroxypyridine-4,5-dimethylol ether in which both methylol groups are etherified.

The dimethylol ether groups are hydrolyzed to methylol groups, e. g. by reaction with concentrated hydrogen halides and hydrolysis of the resulting dimethylol halides to pyridoxane (i. e., vitamin B$_6$, or 2-methyl-3-hydroxy-4,5-dimethylol pyridine), which can be isolated in the form of a crystalline hydrohalide.

Preferred methods for carrying out the process of my invention are illustrated in the following examples, wherein parts and percentages are by weight.

*Example 1*

86 parts (1 mol) of 3-ketotetrahydrofurane are mixed with 120 parts (2 mols) of methyl formate and the mixture cooled to 0° C. 59.4 parts (1.1 mol) of sodium methylate powder, or a methanol solution of sodium methylate obtained by dissolving 25.3 parts of sodium metal in absolute methanol, are added with vigorous agitation to the mixture, whereby 4-formyl-3-ketotetrahydrofurane and its sodium enolate are formed. Upon completion of the resulting reaction, 117 parts (1 mol) of β-aminobutyric acid methyl ester is slowly added to the slurry while maintaining the temperature at 0° C. Cooling is discontinued, and the reaction allowed to proceed at room temperature (about 25° C.) until complete, whereby 2-methyl-4,5-epoxy - dimethyl - dihydropyridine - 3 - carboxylic acid methyl ester is formed.

Excess methyl formate and methanol are removed by distillation under reduced pressure, and 30% aqueous hydrogen peroxide is gradually added to the residue until an excess of the peroxide persists for 5 minutes in the reaction mixture, as indicated by discoloration of potassium iodide-starch paper. The dihydropyridine compound is thereby oxidized to 2-methyl-4,5-epoxydimethyl nicotinic acid methyl ester.

Upon completion of the oxidation, the reaction mixture is boiled with excess strong aqueous caustic soda solution to saponify the methyl ester group, thus forming the corresponding free nicotinic acid. Water-insoluble impurities are removed by extraction of the aqueous solution with ether, and after separation of the ether extract from the aqueous portion of the mixture, the latter is acidified with an excess of sulfuric acid, and again extracted with ether. Sufficient aqueous caustic soda solution is added to the resulting solution to adjust the pH to 6.8, and the solution is then evaporated to dryness under reduced pressure.

The residue, consisting mainly of sodium sulfate and 2-methyl-4,5-epoxydimethyl nicotinic acid, is ground and suspended in 500 cc. of concentrated sulfuric acid at 40 to 60° C. The suspension is agitated, and 65 parts (1 mol) of sodium azide are slowly added. Nitrogen and CO$_2$ are evolved as gases, and when the evolution ceases, the mixture is poured onto ice. An excess of caustic soda is added, and 2-methyl-3-amino-4,5-epoxydimethyl pyridine recovered by steam distillation. Alternatively, the strongly alkaline mixture can be extracted with ether, and the ether extract separated from the aqueous solution and evaporated to recover a residue of 2-methyl-3-amino-4,5-epoxydimethyl pyridine in the form of a light-colored oil. The product can be purified by neutralizing with sulfuric acid, and recrystallizing the resulting sulfate from aqueous alcoholic solution.

150 parts of 2-methyl-3-amino-4,5-epoxydimethyl pyridine are dissolved in 300 parts of water and 240 parts of sodium nitrite are added thereto. The mixture is agitated and 3350 parts of 2 N. sulfuric acid, preheated to about 90° C., are slowly added, to effect diazotization of the amino group, and decomposition of the diazo group to form the corresponding hydroxyl compound. Instead of the free base, an equivalent amount of the purified sulfate can be used in the diazotization step, the amount of 2 N. sulfuric acid used being decreased by the amount required to form the sulfate of the pyridine base. When nitrogen evolution ceases, the solution is maintained at about 90° C. for an additional 15 minutes, whereupon an excess of urea is added to destroy excess nitrous acid. The solution is cooled, neutralized with caustic soda and evaporated under reduced pressure until most of the organic components have separated in the form of a water-immiscible oily layer. The residue is extracted with ether, and the ether extract dried and evaporated, whereby 2-methyl-3-hydroxy-4,5-epoxydimethyl pyridine is recovered in the form of a light-colored oil. This compound is converted to pyridoxine (vitamin B$_6$) upon hydrolyzing the epoxydimethyl radical, e. g. by treatment with concentrated hydrobromic acid and hydrolysis of the resulting bromomethyl radicals with an alkali.

An alternate method of replacing the carboxyl group with the amino group is by means of the Hofmann reaction. The dry residue mentioned above as consisting mainly of sodium sulfate and the substituted nicotinic acid is ground up and for every 179 parts of the nicotinic acid in the mixture, first 100 parts of dry pyridine then 131 parts of thionyl chloride are added with stirring, keeping the reaction mixture at 0° C. during the addition. After one hour at this temperature, the reaction mixture is heated to 50° to 80° C. for one hour, then cooled, and poured into a large excess of concentrated ammonium hydroxide. After thorough digestion with the ammonia, the substituted nicotinic amide is filtered off, and washed with cold water to remove inorganic compounds.

Fifty-four parts of bromine are added portionwise to 51 parts of potassium hydroxide dissolved in 200 parts of water with 300 parts of crushed ice. To this solution with stirring are added 58.2 parts of the above amide, then an additional 72 parts of potassium hydroxide dissolved in 125 parts of hot water. The temperature of the mixture is allowed to rise to room temperature, and then heated to 70° to 75° C. for one hour. The amino-pyridine formed is recovered essentially as described before.

*Example 2*

The sodium enolate of 3-formyl-4-ketotetrahydrofurane is prepared from 86 parts of 3-ketotetrahydrofurane and 120 parts of methyl formate in the same manner as described in the preceding example. The resulting 3-formyl-4-ketotetrahydrofurane compound is condensed with 104 parts (1 mol) of 2-amino-1-nitropropane by the same procedure as the condensation with 3-aminobutyric ester described in Example 1, yielding 2-methyl-3-nitro-4,5-epoxydimethyldihydropyridine as a reaction product. After evaporation of alcohol and methyl formate, the residue containing the dihydropyridine compound is oxidized with 30% hydrogen peroxide, as described in Example 1, to 2-methyl-3-nitro-4,5-epoxydimethyl pyridine. The reaction mixture is neutralized with sulfuric acid to a pH of 7.3 and extracted with ether. The ether extract is separated, and evaporated, yielding 2-methyl-3-nitro-4,5-epoxydimethyl pyridine in the form of a yellow oil. This product is dissolved in methanol, and reduced to 2-methyl-3-amino-4,5-epoxydimethyl pyridine by adding a Raney nickel catalyst and agitating the methanol solution in an atmosphere of hydrogen. When no further hydrogen is absorbed, the catalyst is filtered out, and the methanol evaporated, leaving 2-methyl-3-amino-4,5- epoxydimethyl pyridine as an oily residue. This product is purified by conversion to its sulfate and recrystallization as described in Example 1. The purified sulfate is converted by diazotization of the amino group and decomposition of the diazo compound to 2-methyl-3-hydroxy-4,5-epoxydimethyl pyridine, and thence to pyridoxine, in the same manner as in the preceding example.

In either of the foregoing examples, pyridoxine can be obtained in somewhat lower yields by substituting, for 3-keto-tetrahydrofurane, an equivalent amount of 1,4-dimethoxybutanone-2. The intermediate compounds produced by this modification of Example 1 are the sodium enolate of 1,4-dimethoxy-3-formylbutanone-2, 2-methyl-4,5-dimethoxymethyl-dihydropyridine-3-carboxylic acid methyl ester, 2-methyl-4,5-dimethoxymethyl nicotinic acid methyl ester, the corresponding free carboxylic acid, 2-methyl-3-amino-4,5-dimethoxy pyridine, and 2-methyl-3-hydroxy-4,5-dimethoxymethyl pyridine, which latter compound can be converted by hydrolysis to pyridoxine in the same manner as the corresponding 4,5-epoxydimethyl compound of Example 1.

In Example 2, substitution of 1,4-dimethoxybutanone-2 for 3-ketotetrahydrofurane results in the following intermediates: the sodium enolate of 1,4-dimethoxy-3-formylbutanone-2, 2-methyl-3-nitro-4,5-dimethoxymethyl-dihydropyridine, 2-methyl-3-nitro-4,5-dimethoxy pyridine, 2-methyl-3-amino-4,5-dimethoxymethyl pyridine, and 2-methyl-3-hydroxy-4,5-dimethoxymethyl pyridine.

Similarly, other functional derivatives of 3-aminobutyric acid can replace the ester employed in Example 1, e. g. the corresponding nitrile, amide, N-mono- and N,N-dialkylamides, the corresponding thio esters, thioamides, as well as the free carboxylic acid, or the analogous thioic or dithioic acids. Similarly, β-amino-propyl alkylketones or thioketones in which the alkyl group is preferably a methyl group can replace the β-aminobutyric ester of Example 1. The resulting pyridine compounds, obtained by the dehydrogenation step of Example 1 can be converted by hydrolysis or oxidation to the corresponding 3-carboxylic acids or their thio analogs, and thence, via the corresponding azides of the Curtius reaction, to the corresponding 3-aminopyridines, the other steps of the procedure following that of Example 1.

Variations and modifications which will be obvious to those skilled in the art can be made in the procedures hereinbefore described without departing from the scope or spirit of the invention.

I claim:

1. In a process for the preparation of a member of the group consisting of pyridoxine and intermediates therefor, the step which comprises condensing an alkyl formate with an ether of 1,4-dihydroxybutanone-2 of the class consisting of lower alkyl ethers and the cyclic inner ether thereof in which both hydroxyl groups are etherified, in a reaction medium containing an alkali metal alcoholate, to form the corresponding ether of 1,4-dihydroxy-3-formylbutanone-2.

2. In a process for the preparation of a member of the group consisting of pyridoxine and intermediates therefor, the step which comprises condensing, in a reaction mixture containing an alkali metal alcoholate, an ether of 1,4-dihydroxy-3-formylbutanone-2 of the class consisting of lower alkyl ethers and the cyclic inner ether thereof in which both hydroxyl groups are etherified, with a compound having the general formula:

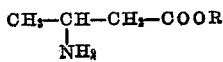

wherein R is an alkyl group, to form a 2-methyl-dihydropyridine-4,5-dimethylol ether of the class consisting of lower alkyl ethers and the cyclic inner ether thereof in which both methylol groups are etherified, and containing the COOR group as a substituent in the 3-position.

3. A process as defined in claim 2, including the additional step of treating the dihydropyridine compound with an oxidizing agent to convert said compound to the correspondingly substituted pyridine compound.

4. A process as defined in claim 3, including the further step of converting the COOR group to a primary amino group, yielding by reaction with an alkali metal azide in acid medium a 2-methyl-3-aminopyridine-4,5-dimethylol ether of the class consisting of lower alkyl ethers and the cyclic inner ether thereof in which both of the methylol groups are etherified.

5. A process as defined in claim 4, including the further step of diazotizing the 2 - methyl - 3 - aminopyridine-4,5-dimethylol ether by treatment with nitrous acid and heating the resulting diazo compound to form a 2-methyl-3-hydroxypyridine-4,5-dimethylol ether of the class consisting of lower alkyl ethers and the cyclic inner ether thereof in which both of the methylol groups are etherified.

6. In a process for the preparation of a member of the group consisting of pyridoxine and intermediates therefor, the steps which comprise condensing an alkyl formate with 3-ketotetrahydrofurane in the presence of an alkali metal alcoholate, condensing the resulting enolate of 4-formyl-3-ketotetrahydrofurane with a β-aminobutyric acid ester to form a 2-methyl-4,5-epoxydimethyl tetrahydropyridine-3-carboxylic acid ester, treating the latter ester with an oxidizing agent to form the corresponding 2-methyl-4,5-epoxydimethyl nicotinic acid ester, saponifying the latter ester to form the corresponding carboxylic acid, reacting said carboxylic acid with hydrazoic acid whereby decomposition of the resulting carboxy azide group occurs to form 2-methyl-3-amino-4,5-epoxydimethyl pyridine, and heating the latter compound with nitrous acid to convert the product to 2-methyl-3-hydroxy - 4,5 - epoxydimethyl pyridine.

7. An ether of 1,4-dihydroxy-3-formylbutanone-2 of the class consisting of lower alkyl ethers and the cyclic inner ether thereof in which both hydroxyl groups are etherified.

8. 3-keto-4-formyl-tetrahydrofurane.

9. 2-methyldihydropyridine-4,5-dimethylol ethers of the class consisting of lower alkyl ethers and the cyclic inner ether thereof in which both methylol radicals are etherified and having in 3-position a COOR substituent wherein R is an alkyl group.

10. An ester of 2-methyl-4,5-epoxydimethyl dihydronicotinic acid.

11. A 2-methyl pyridine-4,5-dimethylol ether of the class consisting of lower alkyl ethers and the cyclic inner ether thereof in which both methylol radicals are etherified, and having in 3- position a COOR substituent wherein R is an alkyl group.

12. 2-methyl-4,5-epoxydimethyl nicotinic acid.

References Cited in the file of this patent

UNITED STATES PATENTS

| | | |
|---|---|---|
| 2,272,198 | Harris | Feb. 10, 1942 |
| 2,422,195 | Harris | June 17, 1947 |
| 2,522,407 | Snell | Sept. 12, 1950 |
| 2,650,232 | Jones | Aug. 25, 1953 |